United States Patent [19]

Allread et al.

[11] Patent Number: 5,406,980
[45] Date of Patent: Apr. 18, 1995

[54] DEEP DRAWN QUICK CONNECT COUPLING

[75] Inventors: Alan R. Allread, Armada; Frank D. Hawley, Macomb; Jon A. Jensen, New Baltimore, all of Mich.

[73] Assignee: Aeroquip Corporation, Maumee, Ohio

[21] Appl. No.: 218,368

[22] Filed: Mar. 28, 1994

[51] Int. Cl.⁶ ............................................. F16L 29/00
[52] U.S. Cl. ............................... 137/614.03; 285/319
[58] Field of Search .................... 137/614.04, 614.05, 137/614.06, 614.03; 251/149.1, 149.6; 285/317, 319, 320; 72/348, 334; 29/888.451, 888.452

[56] References Cited

U.S. PATENT DOCUMENTS

| | | | |
|---|---|---|---|
| 4,221,235 | 9/1980 | Maldavs | 137/614.04 |
| 4,240,651 | 12/1980 | Mariaulle | |
| 4,519,449 | 5/1985 | Hoskins et al. | |
| 4,538,679 | 9/1985 | Hoskins et al. | |
| 4,637,640 | 1/1987 | Fournier et al. | |
| 4,647,082 | 3/1987 | Fournier et al. | 285/320 X |
| 4,749,214 | 6/1988 | Hoskins et al. | |
| 4,793,637 | 12/1988 | Laipply et al. | |
| 4,902,043 | 2/1990 | Zillig | |
| 4,936,345 | 6/1990 | Nix | 137/614.03 |
| 5,215,122 | 6/1993 | Rogers et al. | |
| 5,248,168 | 9/1993 | Chichester et al. | 285/319 X |

*Primary Examiner*—Martin P. Schwadron
*Assistant Examiner*—Kevin L. Lee
*Attorney, Agent, or Firm*—Emch, Schaffer, Schaub & Porcello

[57] ABSTRACT

A coupling assembly is disclosed having a female element with a conically shaped transition segment integrally formed between a mating segment and a central segment. As the mating segment of the male element is inserted into the female element, the conical transition segment serves to guide to the mating segment into an engaged position with the central segment of the female element.

15 Claims, 3 Drawing Sheets

DEEP DRAWN QUICK CONNECT COUPLING

BACKGROUND ART

The present invention provides a quick connect/disconnect fluid coupling which is composed of interconnecting or mating male and female coupling elements. More particularly, the fluid coupling of the present invention provides a threadless quick connect/disconnect pressurized fluid coupling system for use with such things as hydraulic clutch and brake lines, engine and transmission coolant and lubricant lines, power steering and air-conditioning hoses, and gauge lines. The coupling elements of the invention are intended for use with any fluid system incorporating pressurized fluid lines.

Fluid couplings normally consist to two elements which are engageable to provide fluid flow therethrough without leakage. The two elements are most commonly found to be a male element and female element which are interconnected and latched together. Such coupling and latching art is extremely diverse and highly adapted to meet specified performance standards and installation requirements.

A common coupling design is found in the quick connect fitting of U.S. Pat. No. 4,647,082 which discloses a fluid coupling consisting of a female element and male element wherein the fluid interconnection is achieved by axially inserting the male part into the female part until latching is achieved. Latching is produced by means of a plurality of resilient fingers located about the interior annular surface of the female part which engage an annular shoulder formed on the male part. The interconnection of the elements is released when the resilient fingers are disengaged from the shoulder by an axially displaceable sleeve permanently mounted on the male part. The sleeve is axially displaceable from a position of nonengagement to a release position which engages the fingers and removes the fingers from their engagement with the shoulder, thereby permitting the male part to be disconnected from the female part. A similar type device is disclosed in U.S. Pat. No. 4,793,637.

Problems have been encountered with the latch and coupling devices of the type shown in U.S. Pat. Nos. 4,647,082 and 4,793,637 when the coupling elements are located in a respective orientation that hinders the ability to axially align the male and female elements prior to insertion and coupling. Many times if the male and female elements are angularly disposed, for instance when attempting to couple the elements with no visual assistance, the interfaces between the male and female elements do not properly mate, thereby creating problems in achieving a complete and sealed coupling. Further problems have been encountered with the O-ring seals located on the male element. If the two coupling elements are misaligned when they are engaged, the O-ring seals have, on occasion, been cut and abraded, thereby providing a potential fault in the coupling. Since the interfaces between the male element and female element sometimes tend to become improperly engaged, the present invention offers a structure intended to improve upon the prior art structures.

Thus, it is an object of the present invention to provide male and female elements for a quick connect/disconnect coupling which allow for better blind coupling between the elements.

Another object of this invention is to provide improved male and female elements for a quick connect/disconnect coupling which allow the elements to be engaged together at an angular disposition and guided into a complete axially aligned intercoupling.

DISCLOSURE OF THE INVENTION

This invention achieves the above-stated objectives by providing a threadless quick connect coupling for use with a pressurized automotive fluid system such as hydraulic clutch and brake lines, engine and transmission coolant and lubricant lines, power steering and air-conditioning hoses, and gauge lines. The elements of the coupling of the present invention are commonly composed of metal or plastic and are capable of withstanding temperature gradients from $-40°$ F. to $+275°$ F. In the preferred embodiment of this invention, the housing of the elements are deep drawn in manufacture in an essentially scrapless procedure. The coupling elements can be provided for use with rubber, plastic or metal tubing and hose. The coupling elements of the invention eliminate interconnection problems such as cross-threading, over torquing, under torquing and hose twisting which can shorten hose life by as much as 95% at rated operating pressures.

The present invention provides a fluid coupling assembly composed of a male element and a female element which are engaged through latching produced by a plurality of resilient fingers mounted on the female part which engage an annular shoulder formed on the male part. Release of the latching fingers is achieved by an axially displaceable sleeve permanently mounted on the housing of the male element and moveable to a release position engaging the resilient fingers and removing the fingers from engagement with the shoulder. The female housing further includes a conical transition segment having an interior surface defining an increasingly smaller diameter over a specified axial distance. The conical interior surface is so defined as to promote an interface with a similar conically shaped transition segment located on the exterior annular mating end of the male element. The conical interface provides better guidance in properly aligning the male component into the correct latching orientation with respect to the female component. The guidance provided by the conical segments during interconnection provides for better blind coupling of the elements which are frequently pushed together at an awkward angular disposition with regard to each other. Finally, to further assist in guidance of the elements during the coupling procedure, the female coupling element includes a sheet metal stamped guide and centering member which centers the resilient spring member within the longitudinal channel of the female element and further allows the stem valve to seek its own center.

The present invention will be more readily understood with reference to the following description of the preferred embodiment and the accompanying drawings.

BEST MODE OF CARRYING OUT THE INVENTION

The present invention provides for a coupling assembly composed of a male element and a female element, the housing of which are formed from a deep drawing process which provides for a scrapless or nearly scrapless product of manufacture. Deep drawing production methods provide an improvement over prior known methods of manufacturing such as machining and forging. Such prior manufacturing methods sometimes produce parts having microscopic fault lines which could lead to premature failure of the part. A deep drawn element will have improved material grain orientation and enhanced strength characteristics. The coupling assembly of this invention improves upon prior art structures by providing for enhanced coupling by means of structural alteration in the housing of the coupling elements.

Figure 1:
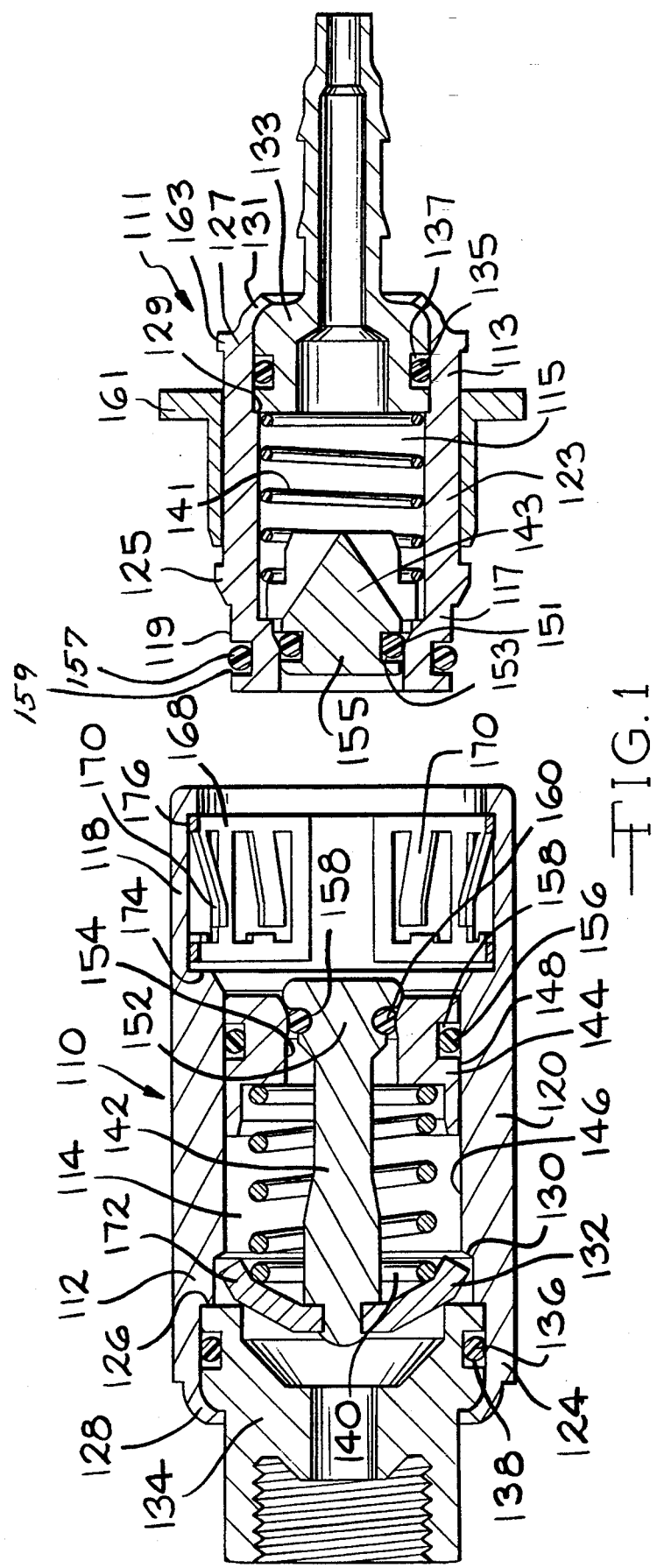
FIG. 1 is an elevated sectional view showing the male element and female element of a prior art coupling device.

Referring now to FIG. 1, a prior art coupling assembly of the type on which the present invention is intended to improve is shown. The coupling assembly of the prior art includes female element 110 having an annular housing 112 defining a longitudinal channel 114 extending therethrough about a central axis. The annular housing 112 includes an integrally formed mating segment 118, central segment 120 and a retention segment 124. Positioned within the retention segment 124 is a female adaptor member 134, in this case a threaded connector nut, which is fixed in position between a shoulder 126 located on the interior circumference of the housing 112 and a stake housing 128 formed on the end of the housing 112. An O-ring 136, positioned in an annular groove 138 located in the female adaptor 134, creates a seal with the interior surface of the retention segment 124 and prevents fluid leakage along the interface between the adaptor 134 and housing 112. The mating segment 118 of the female element 110 retains a latch member 168 positioned and fixed between opposed shoulders 174, 176. The latch member 168 includes resilient finger members 170 which are biased radially inward into the channel 114. Located between the mating segment 118 and the retention segment 124 of the housing 112 and integrally formed therewith is a central segment 120, which commonly has a smaller interior diameter than the mating segment 118, the smaller interior diameter being defined by the shoulder 174. A guide member 132 is fixed in position within the channel 114 at the proximate transition point between the central segment 120 and the retention segment 124. The guide member 132 preferably includes three legs 172 which extend radially outward from the centerline axis of the channel 114 and are retained in a fixed position by engagement with a shoulder 130 and the adaptor 134. The area between the three legs 172 is open, allowing for fluid flow through the channel 114. A stem member 142 is positioned along the central axis of the housing 112 within the central segment 120 and is retained in its centered position at one end by engagement with the guide member 132. A sleeve member 144 is positioned about the opposed end of the stem member 142 and engages the stem member 142 at its free end 152 to help in maintaining the stem member in its centered axial orientation along the central axis of the channel 114. The sleeve member 144 includes an annular exterior surface 148 designed to engage the interior surface 146 of the central segment 120. An O-ring 156 is positioned in an annular groove 158 located in the exterior annular surface 148 of the sleeve member 144 to engage the interior surface 146 of the central segment 120 to seal the interface between the annular exterior surface 148 and the interior surface 146, thus preventing fluid leakage therebetween. Another O-ring 160 carried in an annularly disposed groove 158 on the stem member 142 serves to engage the annular interior surface 154 of the sleeve member 144 to seal the interface between the free end 152 of the stem member 142 and the sleeve member 144 to prevent fluid leakage therebetween. A resilient member 140 is positioned in the channel 114 between the sleeve member 144 and guide member 132 and serves to normally bias the sleeve member 144 into its sealed engagement between the stem member 142 and the interior surface 146 of the central segment 120, as shown in FIG. 1.

The prior art male element 111 includes an annular housing 113 defining a longitudinal channel 115 extending therethrough about a central axis. The annular housing 113 includes a mating segment 117 integrally formed with a retention segment 127 and a central segment 123 located therebetween. A male adaptor 133 is positioned in the retention segment 127 and is fixed between a shoulder 129 located on the interior surface of the housing 113 and a stake housing 131 formed at the end of the retention segment 127. The male adaptor includes an O-ring 135 positioned in an annular groove 137 which engages the interior surface of the retention segment 127 and seals the interface between the interior surface of the retention segment 127 and the adaptor 135 to prevent fluid leakage therebetween. The mating segment 117 of the annular housing 113 includes an annular outer surface 119 designed to interface with the small diameter inner surface 146 of the central segment 120 of the female element 110. An O-ring 157 is positioned in an annular groove 159 located on the annular outer surface 119. During engagement between the male element 111 and female element 110, the O-ring 157 engages the interior surface 146 of the central segment 120 of the female element 110, thus preventing any fluid leakage therebetween. The O-ring 157 is sometimes subject to damage if the two elements 110, 111 are misaligned when engagement is attempted. Further, the exterior surface of the annular housing 113 of the male element 111 includes an outwardly extending shoulder 125 positioned at the transition between the mating segment 117 and the central segment 123. The central segment 123 of the annular male housing 113 lies between the shoulder 125 and a second outwardly extending shoulder 163 located at the transition between the central segment 123 and the retention segment 127. Positioned about the annular exterior surface of the central segment 123 is a sleeve member 161 designed to axially move between shoulder 125 and shoulder 163. A male poppet 143 is positioned within the longitudinal channel 115 defined by the annular housing 113 and is engaged with the interior annular surface of the mating segment 117. An O-ring 151 is positioned in an annular groove 153 located on the engagement head 155 of the male poppet 143 to engage the interior annular surface of the mating segment 117 and seal the interface between the interior annular surface and the engagement head 155 to prevent fluid leakage therebetween. A resilient member 141, such as a coil spring, extends in the channel 115 between the male poppet 143 and the male adaptor 133 to bias the male poppet 143 into its sealed engagement with the interior surface of the mating segment 117 of the annular housing 113.

In operation, the prior art embodiment of the coupling elements shown in FIG. 1 engage as follows. The mating segment 117 of the male element 111 is positioned within the mating segment 118 of the female element 110 forcing the resilient finger members 170 of the resilient member 140 radially outward against their bias. The stem member 142 of the female element engages the engagement head 155 of the male poppet 143 and the mating segment 117 of the male element 111 engages the sleeve member 144 of the female element 110. As the male element 111 is pushed into further engagement with the female element 110, the mating segment 117 pushes against the sleeve member 144 of the female element 110 and forces the sleeve member 144 to move axially against the bias of the resilient member 140 thereby disengaging from the stem member 142 and opening a fluid flow passage between the stem member 142 and the sleeve member 144. At the same time, the stem member 142 pushes against the male poppet 143 and forces the male poppet 143 to move axially against the bias of the resilient member 141 to disengage from the interior surface of the mating element 117 thereby opening a fluid flow passage between the male poppet 143 and the interior surface of the mating segment 117. When the male element 111 reaches its full extent of travel within the female element 110 the resilient finger members 170 snap radially inward against the shoulder 125 thus locking the male element 111 into its engaged position with the female element 110. To disengage the male element 111 from the female element 110, the sleeve member 161 is axially moved toward the shoulder 125 to engage the resilient finger members 170 and force the resilient finger members 170 radially outward into a position of disengagement with the shoulder 125 thereby allowing the male element 111 to be removed from the female element 110.

Figure 2:
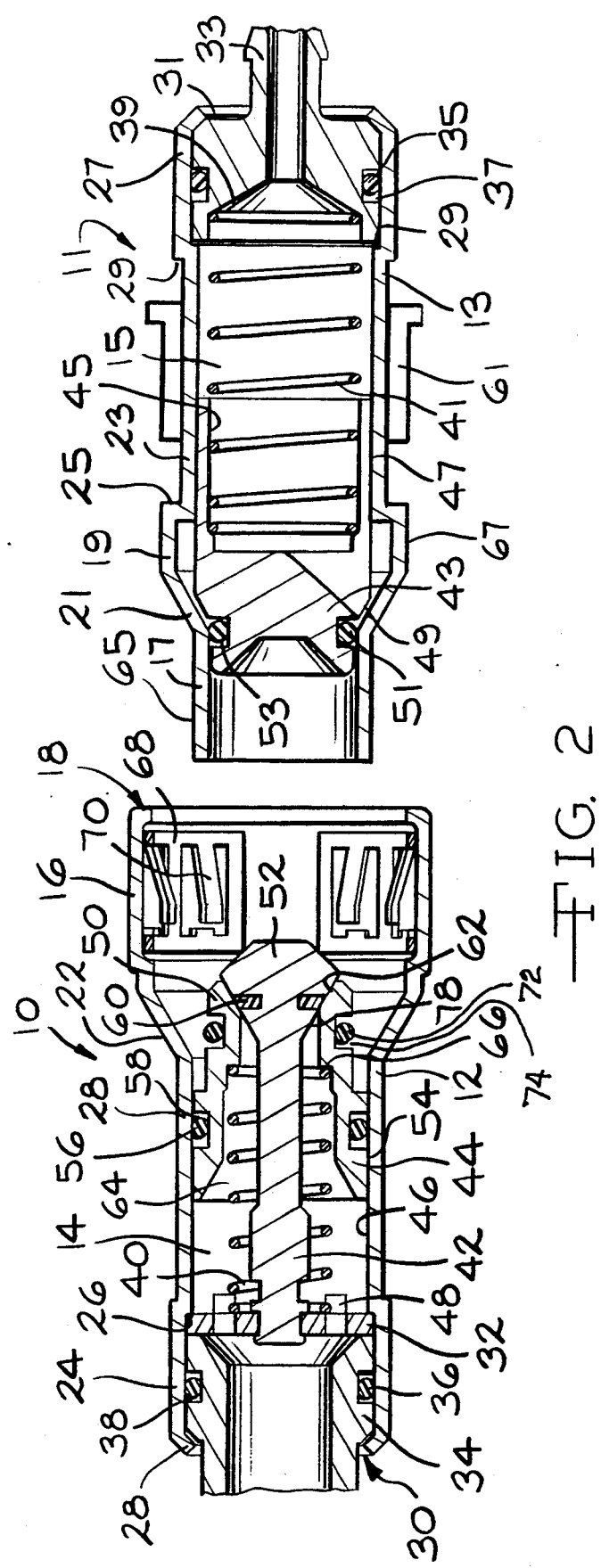
FIG. 2 is an elevated sectional view showing the male element and female element of the coupling device of the present invention in an uncoupled position.
Figure 3:
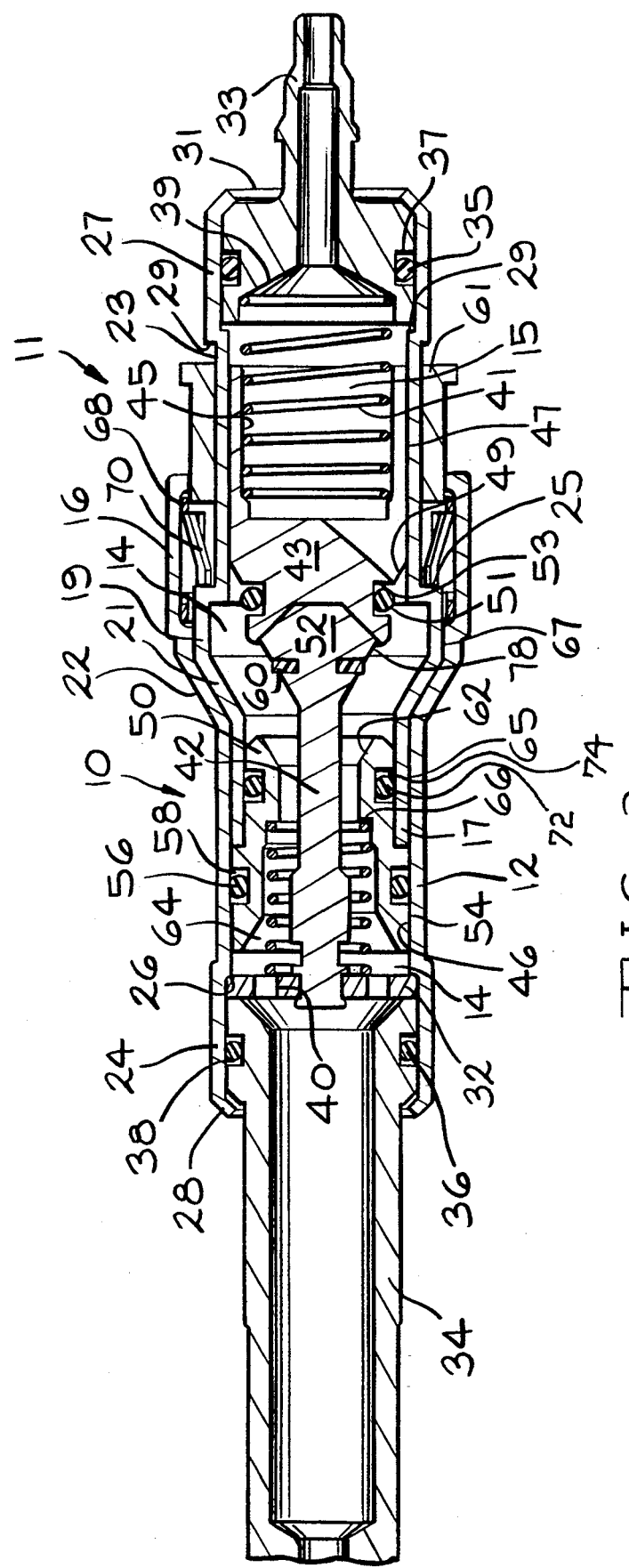
FIG. 3 is an elevated sectional view showing the male element and female element of the coupling device of the present invention in a coupled and latched position.

Referring now to FIG. 2, the present invention, designed to meet the objectives of the invention and improve upon the prior art such as that disclosed in FIG. 1, is shown in detail. The coupling assembly of this invention includes a female element 10 having an annular outer housing 12 defining a longitudinally oriented channel 14 extending therethrough to define a centerline axis. The annular housing 12 includes a large diameter mating segment 16 located at one end 18 of the housing. A smaller diameter central segment 28 is integrally formed with the large diameter mating segment 16 by means of a conically shaped transition segment 22 extending between the large diameter mating segment 16 and the smaller diameter central segment 20. A retention segment 24 is integrally formed with and abuts the smaller diameter central segment 20 at the end opposed to the mating end 18 to form an inwardly extending shoulder 26. The retention segment 24 preferably includes an inwardly disposed stake housing 28 at its extreme end 30. Positioned within the retention segment 24 against the shoulder 26 is a washer-like guide member 32. A female adaptor 34 is positioned within the retention segment 24 and is fixed between the guide member 32 and stake housing 28. The female adaptor 34 includes an O-ring 36 positioned in an annular groove 38 which is compressed against the interface between the interior surface of the annular retention segment 24 and the female adaptor 34, thus sealing the interface against any fluid flow therebetween. The washer-shaped guide member 32 includes a plurality of longitudinally extending centering arms 48 which are positioned about the centerline axis and extend into the channel 14 toward the central segment 20 from the retention segment 24. A longitudinally extending resilient member 40, such as a coil spring, is positioned in the channel 14 defined by the central segment 20 along the center line axis. One end of the resilient member 40 is engaged with the centering arms 48 to assist in centering the resilient member 40 within the central segment 20 in a centered orientation about the centerline axis of the housing 12. A stem member 42 is positioned directly along on the centerline axis of the annular housing 12 and is also retained in position at one end by the washer-shaped guide member 32. The stem member 42 is, preferably, permanently fixed to the guide member 32 by forming or "riveting" the stem 42 to the guide member 32. The stem member 42 extends from the washer-shaped guide member 32 along the axial centerline through the central segment 20, the transition segment 22 and into the large diameter segment 16. An annular sleeve member 44 is positioned in the channel 14 to encompass the stem member 42 and interface with the interior annular surface 46 of the central segment 20. The sleeve member 44 includes a first end 50 having an engagement face 62 angularly disposed to interface with an angular conical face 78 of the free end 52 of the stem member 42. The opposed end of the sleeve member 44 includes an exterior circumferential surface 54 which is annular in shape and designed to interface with the annular interior surface 46 of the central segment 20. The exterior circumferential surface 54 of the sleeve member 44 includes an O-ring 56 positioned in an annular groove 58 to assist in sealing the engagement between the exterior circumferential surface 54 and the annular interior surface 46 of the central segment 21, thereby preventing fluid leakage therebetween. Another O-ring 60 is fixed in the angular face 78 of the free end 52 of the stem member 42 to sealingly engage with the angularly disposed engagement face 62 of the sleeve member 44, thereby providing a leakproof seal between the angularly disposed engagement face 62 and the angular face 78 of the free end 52 of the stem member 42. A third O-ring 72 is positioned in an annular groove 74 located about the periphery of the first end 50 of the sleeve member 44. The O-ring 32 serves to engage the mating segment 17 of the male element 11 to be described shortly hereafter, to prevent fluid leakage therebetween. The sleeve member 44 further defines a longitudinally extending aperture 64 which extends therethrough about the stem member 42 and the resilient member 40. An inwardly disposed shoulder 66 located on the interior surface of the sleeve member serves to engage the free end free of the resilient member 40 and lock the resilient member 40 into an axially centered position between the shoulder 66 of the sleeve member 44 and the guide member 32. The resilient member 40 further serves to bias the angular face 62 of the sleeve member 44 into firm engagement with the angular face 78 of the free end 52 of the stem member 42. It should be noted that the guide member 32, adaptor 34, resilient member 40, stem member 42, and sleeve member 44 are all retained in position within the housing 12 by the stake housing 28. Of course, dependent upon designed requirements, the stake housing 28 can be replaced by a forged, crimped or swaged housing. Finally, a latch member 68 is positioned about the interior surface of the large diameter mating segment 16 which includes a plurality of radially inwardly disposed resilient finger members 70.

The male element 11 of the coupling member of the present invention is disclosed in FIG. 2 as having an annular housing 13 defining a longitudinal channel 15 extending therethrough about its central axis. The annular housing 13 includes a mating segment 17 having an outside annular surface 65 of a diameter designed to mate within the interior surface 46 of the central segment 20 of the female element 10. A large diameter segment 19 is positioned proximate the mating segment 17 and a conically shaped transition segment 21 is integrally engaged with and between the large diameter segment 19 and the mating segment 17. The outside surface 67 of the large diameter segment 19 is of a diameter designed to mate within the interior surface of the large diameter segment 16 of the female element 10. The conical transition segment 21 of the male element 11 is, likewise, designed to interface with the conical transition segment 22 of the female element 10. The male element 11 further includes a central segment 23 which integrally abuts the large diameter segment 19, forming a shoulder 25. The opposed end of the male element 11 includes a retention segment 27 which integrally abuts with the opposed end of the central segment 23 and is of a slightly larger diameter that the central segment 23, thereby forming an outwardly disposed and inwardly disposed shoulder 29 at the transition between the central segment 23 and the retention segment 27. The retention segment 27 further includes an inwardly disposed stake housing 31 at the end opposed to the shoulder 29. Positioned about the annular exterior surface of the central segment 23 is a sleeve member 61 designed to move axially between shoulder 25 and outwardly disposed shoulder 29.

A male adaptor 33 is retained within the retention segment 27 and fixed in a locked position between the inwardly disposed shoulder 29 and the stake housing 31. Preferably, the male adaptor 33 includes an O-ring 35 positioned in an annular groove 37 about the outer circumference of the adaptor 33 to create a leakproof seal between the adaptor 33 and the interior surface of the retention segment 27, thereby preventing fluid leakage therebetween. The end of the male adaptor 33 which is positioned within the retention segment 27 includes a centering cavity 39 disposed about the centerline axis of the male element 11. The centering cavity 39 is used to retain one end of a resilient member 41, such as a coil spring, within the central segment 23 in an oriented position about the centerline axis. Positioned about the opposed end of the resilient member 41 and in communication with the interior circumference of the central segment 23 is a male poppet or sleeve 43. The male poppet 43 includes a cavity 45 oriented about the centerline axis for retaining the resilient member 41 and an annular outer surface 47 for engagement with the interior surface of the central segment 23. The male poppet 43 further includes an angularly disposed surface 49 designed to interface with the conical interior surface of the transition segment 21. An O-ring 51 retained in an annular groove 53 is positioned to provide a sealing engagement between the angular outer surface 47 of the poppet 43 and the inner surface of the mating segment 27 when the poppet 43 is biased to its engaged position by the resilient member 41. The adaptor 33, resilient member 41 and poppet 43 are all retained in position within the housing 13 by the stake housing 31. If designs so require, forged, crimped or swaged housings may also be utilized.

In operation, when the female element 10 and the male element 11 are engaged together, the mating segment 17 of the male element 11 slides into engagement with the sleeve member 44 of the female element 10. The interior surface of the transition segment 22 of the female element 10 serves to guide the mating segment 17 of the male element 11 into its desired position, even when the male element 11 and the female element 10 are in non-aligned positions. When the mating segment 17 of the male element 11 is properly positioned against the sleeve member 44 of the female element, the stem member 42 will engage the engagement surface 55 of the male poppet 43. Further, the outer annular surface of the large diameter segment 19 of the male element 11 engages the interior surface of the large diameter segment 16 of the female element 10, thereby compressing the resilient finger members 70 outwardly against their bias. As the male element 11 and female element 10 are pushed further together to create the fluid connection, the sleeve member 44 is moved longitudinally within the central segment 46 of the female element 10 against the bias of the resilient member 40 to separate the angular face 62 of the sleeve member 44 from the angular face 78 of the angular free end 52 of the stem member 42, thereby providing a channel 80 through which fluid flows. Further, the stem member 42 presses against the poppet member 43 to force the poppet member to move longitudinally within the central segment 23 of the male element 11 against the bias of the resilient member 41, thereby separating the angularly disposed surface 49 of the male poppet 43 from the interior surface of the transition segment 21 of the annular housing 13, thereby providing a fluid passage 71 therebetween. Finally, at the extreme end of travel, the shoulder 25 located at the interface between the large diameter segment 19 and central segment 23 of the male segment 11 moves past the ends of the resilient finger members 70 of the female segment, allowing the finger members 70 to bias radially inward to engage the annular surface of the central segment 23 and lock the male element 11 in place within the female element 10 by positioning against the shoulder 25 of the male element 11. To disengage the male element 11 from the female element 10, the sleeve member 61 is moved axially toward the shoulder 25 to engage the resilient fingers 70 and force the finger members 70 radially outward into a position of disengagement with the shoulder 25, thereby allowing the male element 11 to be removed from the female element 10.

The above description of the preferred embodiment is intended to be illustrative in nature and is not intended to be limiting upon the scope and context of the claims which follow.

We claim:

1. A coupling assembly comprising, in combination:
a female element, having a longitudinal channel extending therethrough, said female element including a central segment having a first interior surface defining a first cross-sectional area of such longitudinal channel, a mating segment located at one end of said female element and having a second interior surface defining a second cross-sectional area larger than said first cross-sectional of such longitudinal channel, and a transition segment integrally formed with and between said central segment and said mating segment to define a conically shaped interior surface of an increasingly smaller diameter over an axial distance extending from said second interior surface to said first interior surface;

a first sleeve member having a first exterior surface for slideably mating with said first interior surface, said first exterior surface further defining a mating exterior surface spaced radially inward from said first exterior surface to define a gap with said first interior surface, said mating exterior surface further extending axially into the channel defined by said transition segment;

a male element having a longitudinal channel extending therethrough, said male element including a mating segment having an exterior surface to fit within and mate with said first interior surface of said female element and an interior surface for engaging said mating exterior surface of said first sleeve member wherein said mating segment is positioned in said gap between said first interior surface of said female element and said mating exterior surface of said first sleeve member and a transition segment integrally formed with said mating segment and having a conically shaped exterior surface for fitting within and mating with said conically shaped interior surface of said female element; and means for locking said male element with said female element upon full insertion of said male element into said female element.

2. The coupling assembly of claim 1, wherein said locking means includes a radially contractible latch member, having a plurality of spaced resilient finger members, positioned about the second interior surface of said mating segment of said female element, said finger members each having a free end radially extending into said channel and wherein said male element includes an upraised shoulder defined on the exterior surface of said transition segment, wherein said resilient finger member move over and engage said shoulder as said male element is inserted into said female element.

3. The coupling assembly of claim 2, wherein said male element includes a central segment integrally formed with said transition segment at said shoulder and a sleeve member positioned about said central segment to move axially along said central segment from a position of non-engagement with said finger members to a position of engagement with said finger members, whereby said finger members are pressed by said sleeve member into a position of disengagement with said shoulder to release said male element from said female element.

4. The coupling assembly of claim 1, wherein said male element and said female element are annular in cross-section.

5. The coupling assembly of claim 1 further including first valve means in said female element, said first valve means being normally biased to seal said channel closed and second valve means in said male element, said second valve means being normally biased to seal said channel in said male element closed, wherein upon insertion of said male element into said female element, said first and second valve means engage to open such channel therethrough.

6. A coupling assembly comprising in combination:

a female, housing, produced by a method of deep drawing metallic material having a longitudinal channel extending therethrough, said female housing including a central segment having a first interior surface defining a first cross-sectional area of such longitudinal channel, a mating segment located at one end of said female housing and having a second interior surface defining a second cross-sectional area larger than said first cross-sectional area of such longitudinal channel, and a transition segment integrally formed with and between said central segment and said mating segment, said transition segment having a conically shaped interior surface extending from said first interior surface to said second interior surface;

a male housing, produced by a method of deep drawing metallic material having a longitudinal channel extending therethrough, said male housing including a mating segment having an exterior surface designed to fit within and mate with said first interior surface of said female housing and a transition segment integrally formed with said mating segment, said transition segment having an exterior surface designed to fit within and mate with said conically shaped interior surface and said second interior surface of said female housing;

means for locking said male housing with said female housing upon full insertion of said male housing into said female housing.

7. The coupling assembly of claim 6, wherein said locking means includes a radially contractible latch member, having a plurality of spaced resilient finger members, positioned about the second interior surface of said mating segment of said female housing, said finger members each having a free end radially extending into said channel and wherein said male housing includes an upraised shoulder defined on the exterior surface of said transition segment, wherein said resilient finger member move over and engage said shoulder as said male housing is inserted into said female housing.

8. The coupling assembly of claim 7, wherein said male housing includes a central segment integrally formed with said transition segment at said shoulder and a sleeve member positioned about said central segment to move axially along said central segment from a position of non-engagement with said finger members to a position of engagement with said finger members, whereby said finger members are pressed by said sleeve member into a position of disengagement with said shoulder to release said male housing from said female housing.

9. The coupling assembly of claim 6, wherein said male housing and said female housing are annular in cross-section.

10. The coupling assembly of claim 6 further including first valve means in said female housing, said first valve means being normally biased to seal said channel closed and second valve means in said male housing, said second valve means being normally biased to seal said channel in said male housing closed, wherein upon insertion of said male housing into said female housing, said first and second valve means engage to open such channel therethrough.

11. A coupling assembly comprising in combination:

a female housing, produced by a method of deep drawing metallic material, having a longitudinal channel extending therethrough, said female housing including a central segment having a first interior surface defining a first cross-sectional area of said longitudinal channel, a mating segment located at one end of said female housing and having a second interior surface defining a second cross-sectional area larger than said first cross-sectional area of such longitudinal channel, and a transition segment integrally formed with and between said central segment and said mating segment to define a conically shaped interior surface of an increasingly smaller diameter over an axial distance extending from said second interior surface to said first interior surface;

a first sleeve member having a first exterior surface for slideably mating with said first interior surface, said first exterior surface further defining a mating exterior surface spaced radially inward from said first exterior surface to define a gap with said first interior surface, said mating exterior surface further extending axially into the channel defined by said transition segment;

a male housing, produced by a method of deep drawing metallic material, having a longitudinal channel extending therethrough, said male housing including a mating segment having an exterior surface to fit within and mate with said first interior surface of said female housing and an interior surface for engaging said mating exterior surface of said first sleeve member wherein said mating segment is positioned in said gap between said first interior surface of said female housing and said mating exterior surface of said first sleeve member and a transition segment integrally formed with said mating segment and having a conically shaped exterior surface for fitting within and mating with said conically shaped interior surface of said female housing; and means for locking said male housing with said female housing upon full insertion of said male housing into said female housing.

12. The coupling assembly of claim 11, wherein said locking means includes a radially contractible latch member having a plurality of spaced resilient finger members positioned about the second interior surface of said mating segment of said female housing, said finger members each having a free end radially extending into said channel and wherein said male housing includes an upraised shoulder defined on the exterior surface of said transition segment, wherein said resilient finger members move over and engage said shoulder as said male housing is inserted into said female housing.

13. The coupling assembly of claim 12, wherein said male housing includes a central segment integrally formed with said transition segment at said shoulder and a sleeve member positioned about said central segment to move axially along said central segment from a position of non-engagement with said finger members to a position of engagement with said finger members, whereby said finger members are pressed by said sleeve member into a position of disengagement with said shoulder to release said male housing from said female housing.

14. The coupling assembly of claim 11, wherein said male housing and female housing are annular in cross section.

15. The coupling assembly of claim 11, further including a first valve means in said female housing, said first valve means being normally biased to seal said channel closed and second valve means in said male housing, said second valve means being normally biased to seal said channel in said male housing closed, wherein upon insertion of said male housing into said female housing, said first and second valve means engage to open such channel therethrough.

* * * * *